Jan. 28, 1969  S. C. HETH  3,423,912
GROUND EFFECT LAWN MOWER
Original Filed July 6, 1965
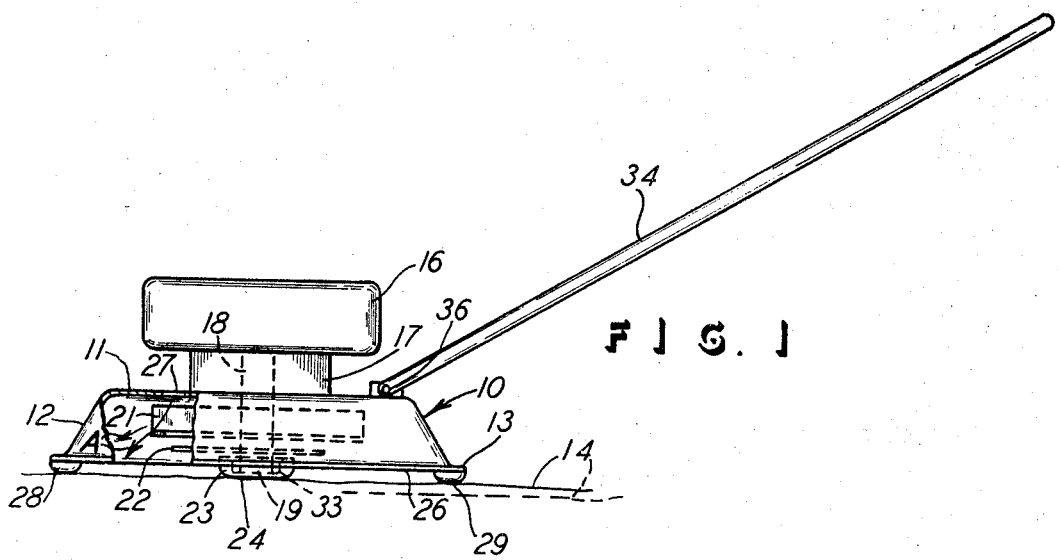
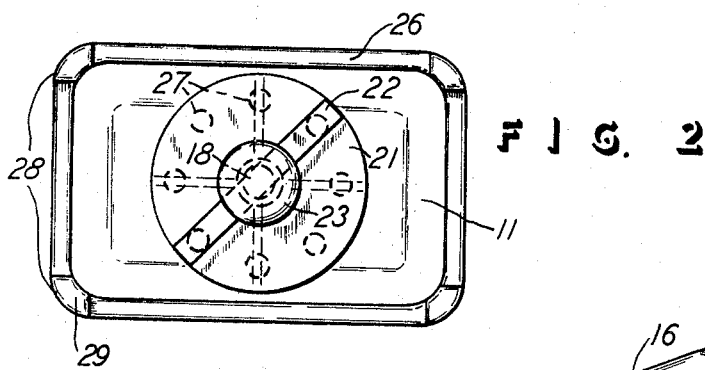
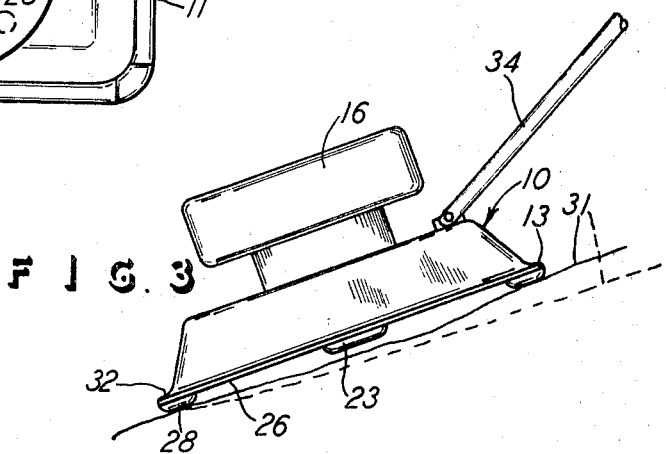
INVENTOR:
SHERMAN C. HETH
ATTORNEY

United States Patent Office 3,423,912
Patented Jan. 28, 1969

3,423,912
GROUND EFFECT LAWN MOWER
Sherman C. Heth, Racine, Wis., assignor to Jacobsen Manufacturing Company, Racine, Wis., a corporation of Wisconsin
Continuation of application Ser. No. 469,743, July 6, 1965. This application Apr. 17, 1968, Ser. No. 722,134
U.S. Cl. 56—25.4                          8 Claims
Int. Cl. A01d 35/26; B60v 1/02

ABSTRACT OF THE DISCLOSURE

A mower housing with handle attached thereto and a cutter and fan rotatably mounted within the housing. The lower edge of the housing has feet or pads attached for keeping the edge and the remainder of the housing spaced from the ground even when the mower is not being supported by the air generated by the fan.

---

This application is a continuation of my earlier application Ser. No. 469,743, filed July 6, 1965, now abandoned.

This invention relates to a lawn mower of the ground effect type, and more especially, it relates to a means for mechanically supporting the mower on the ground.

Ground effect type of lawn mowers exist with a blower or the like disposed within the mower housing to create an air pressure and flow in the housing to support the mower a slight distance above the ground. This type of mower generally does not utilize any ground engaging wheels or the like for mechanically supporting the mower on the ground. Instead, the blower and the grass cutter are operatively associated with the driving shaft so that the pressurized air can be created, and simultaneously the grass will be mowed by the cutter. The mower then floats above the ground, and it can be maneuvered or positioned in any and all directions as it is not restricted to movement only in the fore-and-aft direction as in the instance where ground wheels are employed. Of course, even in rotary mowers with ground wheels, the mower can be maneuvered in turning and lateral directions, but the ground wheels impose some degree of limitation on the maneuverability.

Accordingly, it is a general object of this invention to provide a ground effect type of rotary lawn mower which has both the ground effect means for supporting the mower and the mechanical means for supporting the mower with respect to the ground. In accomplishing this particular object, the mechanical means provided is an inexpensive and simple type, but one which provides an improved operation of the mower in that it permits greater maneuverability and it avoids so-called scalping or low cutting of the grass. That is, in a ground effect mower, it is possible to have the mower tilted with respect to the ground surface so that the end of the mower closer to the ground surface will of course cut lower than the other end of the mower will cut. This results in the so-called scalping of the lawn. This possibility arises when the mower is operated on an incline, in a discontinuous lawn or near the edge thereof, and on an irregular lawn surface, and in other lawn conditions.

Another object of this invention is to provide a ground effect lawn mower which is stable with respect to the ground surface, and which therefore provides an improved mowing of the lawn.

Still a further object of this invention is to provide a ground effect mower which is easily and successfully maneuvered both during the mowing operation as well as during the transport operation when the mower is not being supported on air. That is, the mower can be maneuvered on the ground without of course lifting it even though it is not operating to support itself on air.

Other objects and advantages will become apparent upon reading the following description in light of the accompanying drawings, wherein:

FIG. 1 is a side elevational view of a preferred embodiment of this invention with a part of the view broken away.

FIG. 2 is a bottom plan view of a portion of FIG. 1.

FIG. 3 is a side elevational view of FIG. 1 with a part thereof broken away and showing the mower on an incline or slope.

A housing generally designated 10 includes the top deck or surface 11 and a depending skirt 12 which extends continuously around in the endless configuration shown. The housing 10 terminates in a lower edge or lip 13 which is flared outwardly as shown, and the lower edge is also of a continuous configuration and on a common plane. The plane is of course horizontal when the mower is level as in the FIG. 1 position where it is indicated to be resting upon level ground designated 14. A gasoline engine 16 is shown mounted on the housing 10 and has a member 17 extending down to the housing to mount the engine on the housing in a unitized relation with the housing. The engine crankshaft 18 is shown to extend vertically and below the engine 16 and terminates at the lower end 19. An air blower 21 is affixed to the shaft 18 to rotate therewith, and a cutter 22 is also affixed to the shaft 18 to rotate therewith. Further, a thrust-type of skid or pad 23 is attached to the lower end of the shaft 18 to depend therebelow and present a lower surface 24 which supports the mower on the ground 14. It will of course further be noted that the surface 24 extends below the lower surface 26 on the housing lip 13.

Thus, rotation of the shaft 18 causes like rotation of the blower 21 and the cutter 22 for the respective pressurizing by air of the interior of the housing and the mowing of the lawn.

To provide adequate air pressure for the ground effect or air support of the mower, the housing deck 11 has openings 27 for inlet of air downwardly into the housing, and the air would of course exhaust around the lower lip 13. An arrow designated A generally shows the direction of air flow described. It will of course be understood that upon drawing the air into the housing through the openings 27, the interior of the housing becomes air-pressurized and this causes the housing to rise off the ground 14 to the operating position indicated with respect to the dotted ground line 14. This of course creates a clearance between the housing lower surface 26 and the dotted ground line 14, and the clearance is the distance at which the housing surface 16 floats above the ground line 14 in normal operating conditions.

The housing 10 is provided with pads or skids 28 which are attached to the housing and spaced around the lip 13 in widely spaced positions as indicated in FIG. 2. That is, the pressurized air is free to pass the lip surface 26 both between and below the skids 28, depending upon operating conditions. It will of course be observed that the length and area of the lip surface 26 which is covered by the skids 28 is only a small fraction of the total length in area of the surface 26 and thus the escape of the air is unimpeded.

The skids 28 have lower surfaces 29 disposed on a common plane below the lip surface 26, and the surfaces 29 are shown to be on the same plane with the central skid's surface 24. These surfaces 29 are shown to be disposed for supporting the mower on the ground 14, and they are preferably of a skid shape, that is with rounded or curved edges, so that the mower can be slid over the ground as well as having it supported with the housing lower surface 26 spaced above the ground.

FIG. 3 shows the mower on a sloping ground surface 31. It will readily be understood that the center of mass of the mower is off-set with respect to the normal vertical plane of the mower, and thus most of the weight of the mower is effective at the lower end of the mower. Normally, this would mean that the lower mower end designated 32 would cause the lower surface 26 to rest directly on the ground 31 rather than be spaced thereabove. However, the skid 28 at the mower's lower end 32 of course prevents the surface 26 from contacting the ground 31, and thus the air continues to escape uniformly past the surface 26, as desired. This of course provides the result that the mower will always operate to have the cutter parallel to the ground surface, such as even the sloping surface 31.

Of course, it normally would be that the rotation of the blower 21 would cause the mower housing 10 to rise above the position shown in FIG. 3 so that the entire mower would be further spaced above the ground 31. This would be similar to the ground line indicated 14 by dotted lines in FIG. 1. In an extreme condition and position, the mower may have a relation with respect to the dotted ground line 31, and the lower mower end 32 would be supported off the dotted ground line 31 by the lower skid 28 so that air could escape substantially uniformly from the housing, but, more particularly, the lower end 32 would not touch the dotted ground line 31 and cause scalping or irregular cutting.

The pads or skids 28 are of course suitably affixed to the housing to extend therebelow as shown. The pads 28 are in full air-tight contact with the housing and each pad has a bottom surface for supporting the lawn mower on the ground when the blower is not providing ground effect thereto. The air-tight contact provides an arrangement which is free of any clearance between the lower edge of the housing and the upper edge of each pad. The bottom surface of each pad is on a common plane parallel to and below the plane of the bottom of the housing. The skid 23 is shown attached to the crankshaft 18 by a thrust-type bearing indicated at 33. Such connection would of course be utilized so that the skid 23 would not rotate with the rotation of the shaft 18, but the skid 23 would be disposed below the lower end 19 of the shaft to give a sliding support to the mower and an anti-scalping feature as described.

Further, a handle 34 is shown pivotally attached to the housing 10 by a pin 36. The handle of course permits the guiding and maneuvering positioning of the housing 10. FIG. 2 of course omits the showing of the handle, and FIG. 3 shows it only fragmentarily. With respect to FIG. 3, the mower in relation to the dotted line 31 merely indicates the tilt of the mower with respect to the dotted ground line 31 under a condition where pads or skids, such as the skids 23 and 28, are not utilized. That is, without the skids shown, the mower lower edge 32 would be inclined to a position where the surface 26 would rest on the ground 31 while the opposite end of the mower housing would of course be spaced from the ground and permit all of the air to escape therefrom. The mower simply would not remain parallel with the ground.

While a specific embodiment of this invention has been shown and described, it should be obvious that certain changes could be made in the embodiment.

What is claimed is:

1. In a ground effect lawn mower having a housing and with an air blower and cutter rotatably disposed in said housing, the invention comprising a skirt on said housing and terminating in a lower edge past which is blown the air from said blower in supporting the mower with clearance above the ground, and ground-supported means on said housing and disposed below said lower edge and in full air-tight contact therewith and having a bottom surface for supporting said lawn mower on the ground, said means being in air-tight contact with said lower edge to be free of any clearance with said lower edge and to thereby be free of any air passageway between said means and said lower edge at the location directly above said means, the location of said bottom surface being below said lower edge a distance less than said clearance to normally be clear of the ground when said blower is operating to give ground effect to said lawn mower.

2. In a ground effect lawn mower having a housing and with both an air blower and a cutter rotatably disposed in said housing, the invention comprising a skirt on said housing and terminating in an endless lower edge completely disposed in a plane, and ground supportable pads on said housing and disposed below said lower edge in spaced positions therealong and in full air-tight contact therewith and free of any space between said pads and said lower edge, and with each of said pads having a bottom surface on a common plane parallel to and below the first said plane for supporting said lawn mower on the ground when said blower is not providing ground effect to said lawn mower.

3. In a ground effect lawn mower having a housing and with an air blower and cutter rotatably disposed in said housing, the invention comprising a skirt on said housing and terminating in a continuous lower edge past which air is blown by said blower in supporting the mower with clearance above the ground, and ground skids on said housing and disposed below said lower edge in widely spaced positions therealong and in full air-tight contact therewith to be free of any space between said skids and said lower edge, and with each of said skids having a bottom surface on a common plane for supporting said lawn mower on the ground, the location of said bottom surface being below said lower edge a distance less than said clearance to normally be clear of the ground when said blower is operating to give ground effect to said lawn mower.

4. In a ground effect lawn mower having a housing and engine with a vertical crankshaft and with an air blower and cutter disposed in said housing on said crankshaft for rotation therewith, the invention comprising a skirt on said housing and terminating in a lower edge past which air is blown by said blower in supporting the mower with clearance above the ground, ground supportable pads on said housing and disposed below said lower edge in spaced positions therealong for supporting said lawn mower on the ground and with said pads having lower surfaces disposed on a common plane for horizontal support of said mower on horizontal ground, and a ground supportable axial thrust skid on the lower end of said crankshaft below said cutter and having a lower surface on said plane of said lower surfaces of said pads for slidably supporting said mower on the ground.

5. In a ground effect lawn mower having a housing and with an air blower and a rotary cutter rotatably disposed in said housing, said cutter being rotatable in a plane below said blower, the invention comprising a skirt on said housing and terminating in a lower edge past which is blown the air from said blower in supporting the mower with clearance above the ground and with said lower edge being disposed in a plane below said plane of said cutter, and a plurality of ground-supported pads on said housing and disposed below said lower edge in spaced positions therealong and for a total distance along said lower edge of only a small fraction of and less than one-half the total length of said lower edge, said pads having a bottom surface for supporting said lawn mower on the ground in a position with said lower edge spaced from the ground a distance similar to the spacing between said planes of said rotary cutter and said lower edge and with the latter said distance being adequate for lawn mowing by said rotary cutter, said pads being in air-tight contact with said lower edge to be free of any clearance with said lower edge and to thereby be free of any air passageway between said pads and said lower edge at the location directly above said pads, the location of said bottom surface being below said lower edge a distance less than said clearance to normally be clear of the ground when said blower is operating to give ground effect to said lawn mower.

6. In a ground effect lawn mower having a housing and with both an air blower and a rotary cutter rotatably disposed in said housing and rotatable in a plane, the invention comprising a skirt on said housing and terminating in an endless lower edge completely disposed in a plane below said plane of said rotary cutter, and ground supportable pads on said housing and disposed below said lower edge in spaced positions therealong and in full airtight contact therewith and free of any space between said pads and said lower edge, and with each of said pads having a bottom surface on a common plane parallel to and below said plane of said lower edge and with said bottom surface being spaced only below said lower edge for a distance like the spacing between said planes of said rotary cutter and said lower edge for supporting said lawn mower on the ground when said blower is not providing ground effect to said lawn mower.

7. In a ground effect lawn mower having a housing and with an air blower and cutter rotatably disposed in said housing, the invention comprising a skirt on said housing and terminating in a continuous lower edge past which air is blown by said blower in supporting the mower with clearance above the ground, and ground skids on said housing and being arranged with rounded corners for sliding said mower over the ground and being disposed below said lower edge in widely spaced positions therealong and in full air-tight contact therewith to be free of any space between said skids and said lower edge, and with each of said skids having a bottom surface on a common plane for supporting said lawn mower on the ground, the location of said bottom surface being below said lower edge a distance less than said clearance to normally be clear of the ground when said blower is operating to give ground effect to said lawn mower.

8. In a ground effect lawn mower having a housing and engine with a vertical crankshaft and with an air blower and cutter disposed in said housing on said crankshaft for rotation therewith, the invention comprising a skirt on said housing and terminating in a lower edge past which air is blown by said blower in supporting the mower with clearance above the ground, ground supportable pads on said housing and disposed below said lower edge in spaced positions therealong for only a small fraction of the length of said lower edge for supporting said lawn mower on the ground and with pads having lower surfaces disposed on a common plane for horizontal support of said mower on horizontal ground, said lower surfaces being spaced only a slight distance from said lower edge to assure lawn mowing close to the ground by said rotary cutter when said pads are on the ground, and a ground supportable axial thrust skid on the lower end of said crankshaft below said cutter and having a lower surface on said plane of said lower surfaces of said pads for slidably supporting said mower on the ground.

References Cited

UNITED STATES PATENTS

| | | | |
|---|---|---|---|
| 3,110,996 | 11/1963 | Dahlman | 56—25.4 |
| 3,170,276 | 2/1965 | Hall | 56—25.4 |
| 3,215,218 | 11/1965 | Hurst | 180—116 |
| 3,261,420 | 7/1966 | Schmidt | 180—116 |

ANTONIO F. GUIDA, *Primary Examiner.*

U.S. Cl. X.R.

180—116